(No Model.)
A. LARSEN.
BRAKE FOR HOISTING MACHINES.
No. 439,529. Patented Oct. 28, 1890.
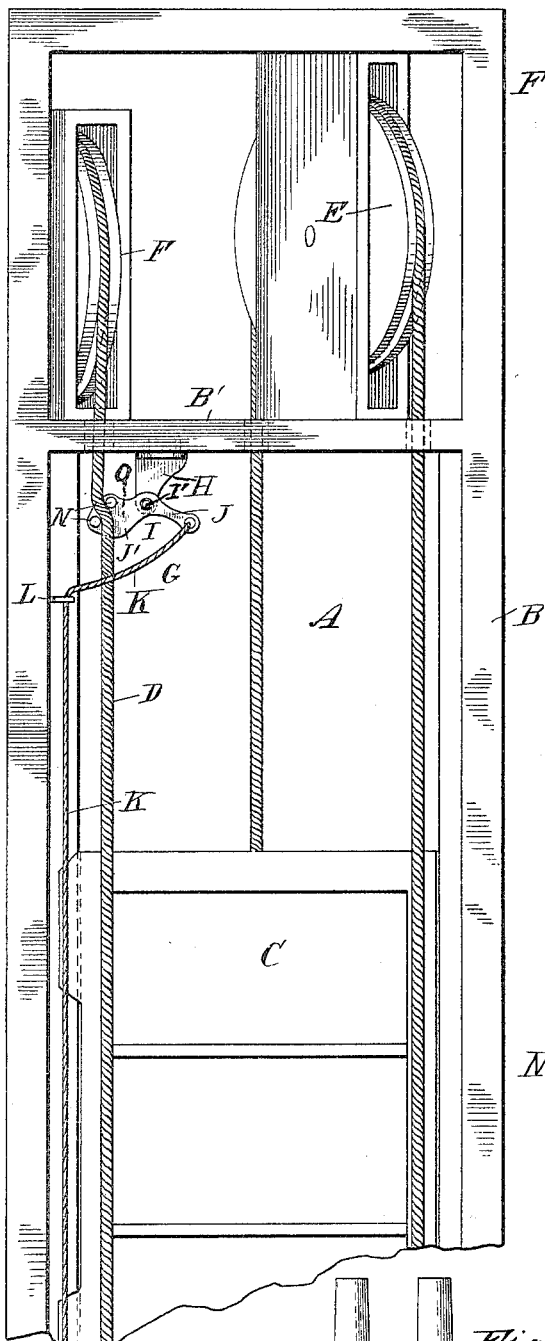
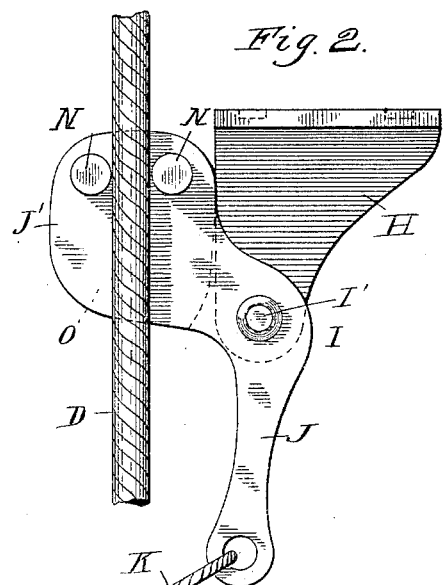
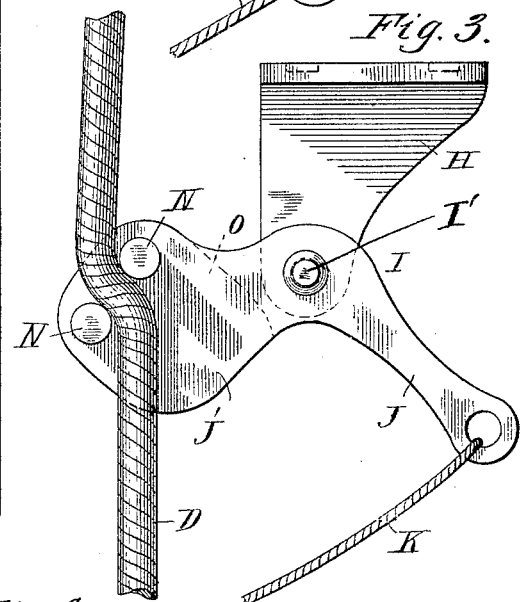
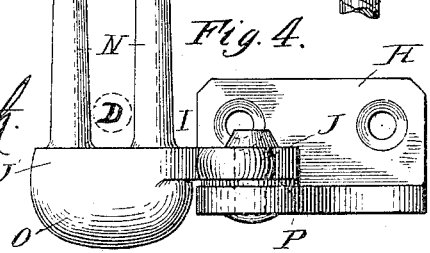
WITNESSES:
INVENTOR:
A. Larsen
BY Munn & Co.
ATTORNEYS ically from or place articles in the cage C without danger of the cage moving up or down.

UNITED STATES PATENT OFFICE.

ANTON LARSEN, OF NEW YORK, N. Y.

BRAKE FOR HOISTING-MACHINES.

SPECIFICATION forming part of Letters Patent No. 439,529, dated October 28, 1890.

Application filed May 15, 1890. Serial No. 351,905. (No model.)

*To all whom it may concern:*

Be it known that I, ANTON LARSEN, of the city, county, and State of New York, have invented a new and Improved Brake for Hoisting-Machines, of which the following is a full, clear, and exact description.

The invention relates to hoisting-machines, and is more especially adapted for dumb-waiters.

The object of the invention is to provide a new and improved brake which is simple and durable in construction and automatically brakes and locks the hoisting-rope and the load suspended therefrom.

The invention consists of a lever provided with two arms standing at or near right angles to each other, and of which one is connected with a brake-rope, and the other is weighted and provided with two pins between which passes the hoisting-rope.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a front view of the improvement as applied to an ordinary dumb-waiter. Fig. 2 is an enlarged front view of the improvement, the hoisting-rope being disengaged. Fig. 3 is a like view of the same as braking the hoisting-rope, and Fig. 4 is an inverted plan view of the brake.

The dumb-waiter A, on which the brake is applied, is provided with the usual shaft B, in which is mounted to slide vertically the cage C, hung on the hoisting-rope D, passing over the usual pulley E, arranged in top of the shaft B, then passing over a bottom pulley, (not shown,) and then up again in front of the cage C, over a pulley F, mounted to turn in the upper end of the shaft B opposite the pulley E. The downwardly-extending end of the rope supports the usual weights for counterbalancing the cage C.

The brake G is arranged in the upper end of the shaft B directly under the pulley F, as is plainly shown in Fig. 1, the said brake being provided with a bracket H, fastened to the under side of the cross-beam B' of the shaft B.

On the bracket H is fulcrumed the lever I, made somewhat in the shape of a bell-crank lever and having one of its arms J connected with the end of a brake-rope K, passing to one side of the shaft B and through a loop or eye L, from which the rope hangs downward in front of the cage C, so as to be within convenient reach of the operator. The other arm J' of the lever I is provided on its front with two pins N, placed suitable distances apart so as to permit the hoisting-rope D to pass freely between the said pins when the lever is in the position shown in Fig. 2.

The pins N are arranged so as to be a suitable distance above the fulcrum I' of the lever I when the latter is in the position shown in Fig. 2, and the outer end of the arm J' of the said lever is provided in its back with a weight O, which has the tendency to throw the lever-arm J' downward, so as to bind the hoisting-rope D between the two pins N. The weight O also serves as a stop when moving the lever I in an uppermost position and pulling on the rope K, the said weight O then striking against the bracket H, thereby limiting the swinging movement of the lever I in one direction.

The operation is as follows: When the operator desires to move the cage C up or down in the shaft B of the dumb-waiter, he manipulates the hoisting-rope D in the usual manner. At the same time he has hold of the brake-rope K, in order to hold the lever I in the position shown in Fig. 2 to permit the hoisting-rope D to pass freely between the two pins N. Now when the operator desires to interrupt the movement of the cage C and to hold it at any desired place or point, he releases the rope K, so that the weighted arm J' of the bell-crank lever I swings downward, thereby binding the hoisting-rope D between the two pins N, so that a further movement of the hoisting-rope is interrupted, and the cage on the hoisting-rope has a further tendency to swing the arm J' of the lever I farther downward to still more bind the hoisting-rope between the two pins N. The cage C is thus securely held in place so as to enable the operator to remove articles from the cage or to place others therein, as desired. When the operator again desires to move the cage up or down, he first pulls on the brake-rope K, so that the latter pulls on the arm J of the lever I, thereby swinging the arm J' of the said lever upward into the position shown in Fig. 2—that is, until the weight O strikes against the bracket H. The lever D is then free to pass between the two pins N, so that the cage C can be raised or lowered in the usual manner by manipulating the hoisting-rope D.

It will be seen that this device is very simple and durable in construction, can be readily applied on any dumb-waiter now in use, and instantly holds and locks the cage in place whenever the operator releases his hold on the rope K.

On the fulcrum-pin of the bell-crank lever I, and between the latter and the bracket H, is placed a leather washer P to deaden the noise caused by the swinging of the lever I.

Having thus fully described my invention, I claim as new and desire to secure by Letters Patent—

1. A brake for hoisting-machines, comprising a lever adapted to be pivoted adjacent to the hoisting-rope and provided with laterally-projecting pins between which the hoisting-rope passes, substantially as described.

2. A brake for hoisting-machines, comprising a bell-crank lever adapted to be pivoted adjacent to the hoisting-rope and having one of its arms provided with laterally-projecting pins between which the hoisting-rope passes and its other arm constructed to receive a brake-rope, substantially as described.

3. A brake for hoisting-machines, consisting of a bell-crank lever adapted to be pivoted adjacent to the hoisting-rope and having one arm provided with laterally-projecting and spaced pins on one face and with a weight on the opposite face, the other arm of the lever being constructed to receive a brake-rope, substantially as herein shown and described.

ANTON LARSEN.

Witnesses:
THEO. G. HOSTER,
C. SEDGWICK.